March 28, 1950     F. A. WADE ET AL     2,502,238
EDUCATIONAL DEVICE
Filed Aug. 20, 1947

INVENTORS
FRANCIS A. WADE
WILLIAM METZNER
BY
Barr, Borden & Fox
ATTORNEYS

Patented Mar. 28, 1950

2,502,238

UNITED STATES PATENT OFFICE 2,502,238

EDUCATIONAL DEVICE

Francis A. Wade and William Metzner, Philadelphia, Pa.

Application August 20, 1947, Serial No. 769,669

4 Claims. (Cl. 35—31)

The present invention relates to educational devices, and more particularly to a novel hundred board assembly for teaching counting, the processes of addition and subtraction, the multiplication combinations, and the basic concepts involved in decimal fractions and percentage.

Some of the objects of the present invention are: to provide a novel device for teaching arithmetic meaningfully so that children will understand the quantities and relationships that are implied in the names, symbols, and operations used; to provide a board assembly so that groups of disks may be arranged and re-arranged thereon to promote understanding of the arithmetical processes; to provide a plurality of charts having numbers arranged thereon in a predetermined manner to promote arithmetical understanding, such charts being adapted for association with the mounting frame; to provide a plurality of disks to be used in concealing the numbers on said charts; to provide a novel masking means provided with a pivot to segregate for study quantities of disks in counting or multiplication, so that the pupil's answers will be self-checking on the card beneath; to provide other masking means so that the area of the board and consequently the number of the disks in view can be varied and thus enable the teacher to present only certain tables at one time; to provide still other masking means so that different patterns of disks may be uncovered and thus present the arithmetical problem situation of determining how many disks are exposed; and to provide other improvements as will hereinafter appear.

Figure 1:
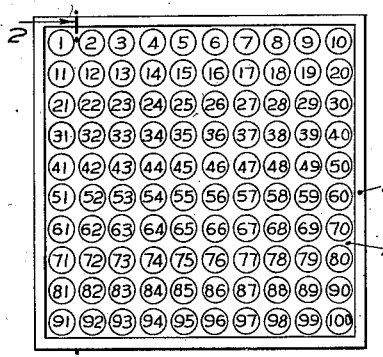
Figure 2:
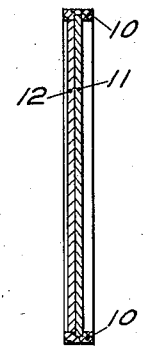
Figure 3:
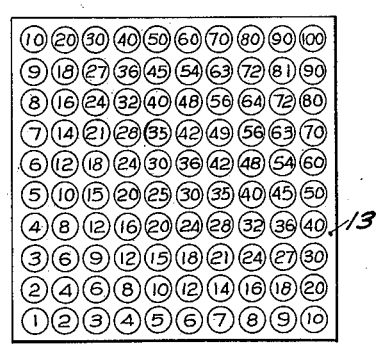
Figure 7:
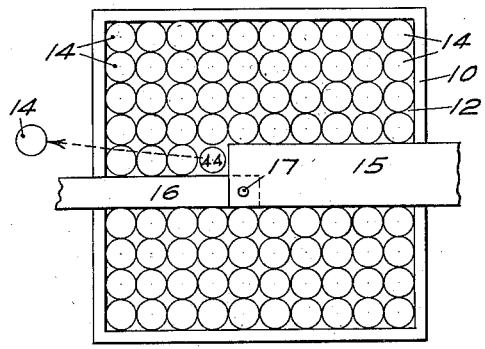
Figure 8:
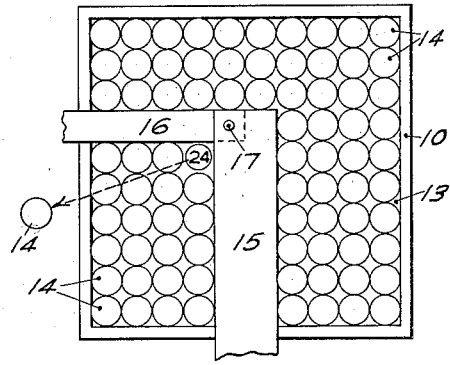
Figure 9:
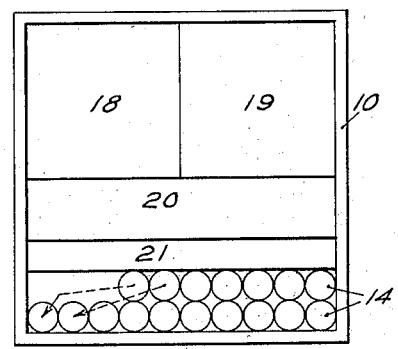
Figure 6:
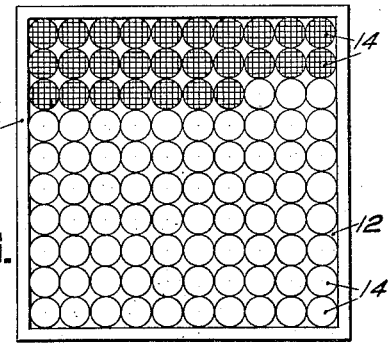
Figure 4:
Figure 5:
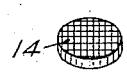

In the accompanying drawings Fig. 1 represents a plan of a chart teaching frame showing a chart therein for number counting; Fig. 2 represents a section on line 2—2 of Fig. 1; Fig. 3 represents a plan of a second chart for use with the frame, the same being arranged for product teaching; Fig. 4 represents a perspective of any one of the disks used with the charts; Fig. 5 represents a perspective of any one of the disks used with the charts but showing the side opposite to that shown in Fig. 4; Fig. 6 represents a plan of the frame showing the disks on the board without using either chart, certain of the disks being reversed with respect to the others for teaching the concepts of decimal fraction and percentage; Fig. 7 represents a plan of the frame with the counting chart placed therein and all the numbers covered with disks except the one disk at the angle of the masking means, which disk has been removed to show the number beneath; Fig. 8 represents the plan of the frame with the product card placed therein and all the numbers covered with disks except the one disk at the angle of the masking means, which disk has been removed to show the total number disks contained in the exposed area; and Fig. 9 represents a plan of the frame showing a modified form of the invention.

Referring to the drawings, one form of the present invention comprises a frame 10, preferably of rectangular shape, having a medially disposed board 11 mounted therein to provide framed recesses at opposite sides for respectively receiving teaching charts for number and product counting. One such chart 12 is shown in Fig. 1 in place for use in the frame 10 and has numbers from 1 to 100 printed thereon in rotation in parallel horizontal rows of ten each. The chart 12 is a separate unit arranged to be placed in either of the frame recesses, and may, if desired, be fastened temporarily in place by any well known means. Another such chart 13, likewise of a size to fit within one of the frame recesses, has numbers printed thereon for multiplication products, that is, the rows run horizontally and parallel in 1 to 10, 2 to 20, 3 to 30 relation successively to the last row of 10 to 100.

For use separately or with and in association with each chart, one hundred disks 14 of circular form are provided, all preferably of the same diameter which is that necessary to cover each number upon a chart and to fit snugly in the frame. Thus, in Fig. 6 all of the disks 14 are in place without a chart, certain of such disks being turned over to expose the black or contrasting color of the disks. In the showing of Fig. 6 there are twenty-seven disks reversed in position in adjacent rows, namely two complete rows and seven in the third row. Since a row of the disks is a tenth of the chart, and single disks are a hundredth of the chart, the result is shown as a decimal fraction, namely ".27."

Small equal groups of disks may be placed at one end of the blank board without using either chart and then rearranged at the other end in tens and ones, thus demonstrating, for example, that three groups of four disks may be rearranged as a 10 and two 1's, or that three 4's are really twelve. Conversely, twelve disks arranged at the end of the board as a 10 and two 1's may be rearranged into three groups of four, thus demonstrating that there are three 4's in twelve.

As a help in teaching counting, a shield or mask is provided comprising two arms 15 and 16 joined together by a pivot 17, one of said arms, namely 16 in the present instance, having a width less than the width of the arm 15 by the diameter of a disk, so that when placed over the face of a chart the counting field can be selectively divided. As shown, the shield is linearly disposed to expose four full rows of disks and four disks of the next row, so that the child can count or see the four rows of ten, making forty, and then the four single disks in the next row to give the number 44. Since the shield is here used with the counting chart 12, the forty-fourth disk can now be removed exposing the number 44 beneath it as the answer to the child's counting. Another use of the shield is shown in Fig. 8, wherein the arms 15 and 16 are set at a right angle so that, when placed over the disks 14, with the product card 13 underneath, any rectangle of disks may be exposed for the child to determine the number of disks contained in the rectangle by first multiplying the number on adjacent sides and then picking out the disk at the angle to verify his answer.

In the use of the invention as shown in Fig. 9 for teaching the adding and subtracting of sums or minuends of 11 to 18, cardboard rectangles 18 19, 20 and 21 may be employed to replace certain of the disks and cut down the area used to two rows of the disks, thus reducing the chart or board to a "Twenty Board" instead of the "One Hundred Board." Preferably, in this form a blank side of the board 11 is used and no charts are needed. For example, in the beginning of teaching the combination 8 plus 7 equals 15, if eight disks are placed in one row and seven in the other row, the child can then move two disks from the shorter row to the longer row, as indicated by the dotted lines, and then have a row of "10" and a row of "5" or "15". At first the child learns to think in this order—8 and 2 equals 10; 2 from 7 equals 5; and 8 and 7 equals 15; and then he gradually understands and memorizes the combination as "8 and 7 are 15." Conversely, subtraction of 8 from 15 may be demonstrated by arranging fifteen disks in one row of ten and five one's. The eight disks in the ten row to be subtracted may then be covered by a strip of cardboard. The remaining one's may then be moved over to the five one's. The child thinks, "8 from 10 leaves 2; 2 and 5 make 7; 8 from 15 leaves 7." This use of two rows of disks is for second year pupils in learning addition or subtraction or the two table, but as the pupil advances and enters the third year, the rectangular strip 20 can be removed so that teaching can now include three rows of the disks to make adding three numbers or the three table possible. Checking of answers can be done when the product sheet is used beneath the disk and masking means. Likewise, as the pupil advances, the strip 19 can be removed to add two more rows of disks and make possible the extension of multiplication to fours and fives. Also, the field of teaching can be further expanded by removing one of the rectangles 18 for the reverse of the tables already taught and the rectangle 19 for the rest of the products of the multiplication tables to 10 × 10.

In the form of the invention shown in Fig. 8, the disks are used in the frame without either of the charts in place. This use of the invention, that is without the counting or product cards, is for teacher demonstration or pupil practice of the basic techniques involved in solving problems in arithmetic. The successive steps in this type of thinking are the examination of the problem situation; a recall of the underlying principles covering it; the formulation of a hypothesis; selecting the data and working out the solution; and the verification of results. By covering some of the disks with shields or masks, various patterns of exposed disks are presented. These patterns may be viewed as problems in which the child is asked "How many disks can you now see?" In order to determine how many disks are exposed when part are covered, the child must first examine the problem situation, must then determine from his knowledge of relationships or experience what arithmetical principles are involved; must next choose a way to arrive at the correct answer; must then select the data needed and perform the arithmetical operations; and must finally verify his answer by one or more of several methods—common sense consideration of its size, repeating the various steps in the solution, or working it out again in a different way.

For example, instead of using the pivoted shield shown in Figs. 7 and 8, the cardboard rectangles such as 18, 19, 20 and 21 can be used separately to cover certain areas thus forming exposed geometrical patterns. If cardboard 19 is partially superposed on a corner of Fig. 8 so that the area containing the disks in a five disk by four disk pattern is completely covered, the child's attention may be directed to the L-shaped geometrical pattern of the exposed disks. To determine how many disks are now exposed, he may think of the disks now showing in four ways (a) as a 5 x 10 rectangle and a 6 x 5 rectangle, (b) 4 x 5 rectangle and a 6 x 10 rectangle, (c) a 4 x 5 rectangle, a 6 x 5 rectangle and a 6 x 5 rectangle, (d) a 10 x 10 rectangle less the concealed 4 x 5 rectangle. After seeing any one of these geometrical patterns he forms his hypothesis to arrive at the number of disks exposed, determines the operations to be used and gets an answer which may be checked by one or more of the ways indicated.

Similarly, two cardboards of the size of 20 (Fig. 9) may be superposed in the form of a Maltese cross on Fig. 8 and thus present four rectangular patterns each containing 4 x 4 disks for solution.

All the cards 18, 19, 20, 21, the pivoted shield 17, and any other cards cut by the ingenious teacher may be used to cover areas of disks, and thus leave exposed geometric patterns for the pupils to determine the number of disks exposed.

Having described our invention, we claim:

1. An educational device, comprising a chart having numbers arranged thereon sequentially from one to one hundred in ten rows of ten numbers each, a frame for mounting said chart having a peripheral wall projecting beyond the face of said chart, and removable opaque blank faced disks for respectively concealing said numbers and being retained by said wall in an observable arithmetical sequence, whereby the removal of a selected disk exposes a number identifying a particular interrelation of the disks.

2. An educational device, comprising a chart having ten rows of numbers with ten numbers to a row, said numbers being so arranged that each number is a product of the first number at the left end of a row and the number at the bottom of that number row, a frame for mounting said chart having a peripheral wall projecting beyond the face of said chart, and removable opaque blank faced disks for respectively concealing said numbers and being retained by said wall in an observable arithmetical relationship, whereby the removal of a selected disk exposes a number identifying said product.

3. An educational device, comprising a framed backing, a chart with numbers arranged thereon sequentially from one to one hundred in ten parallel rows of ten numbers each, one hundred readily removable blank disks, but with contrasting colors on either side, said disks being arranged to fill the frame and to conceal the respective numbers on the chart beneath them, and a shield having two upper parallel edges spaced apart by the diameter of a disc to form a concealing cover for a portion of the length of a selected row and to form a shoulder for juxtaposition to a selected disc of said selected row, said shield being positionable at will so that the exposed selected disc in said shoulder represents the end of a sequence of discs, whereby lifting of the selected disc exposes the chart number corresponding to the sum total of the exposed discs.

4. An educational device, comprising a framed backing, a chart having ten rows of numbers with ten numbers to a row, said numbers being so arranged that each number is the product of the first number at the left end of the row and the number at the bottom of that number row, one hundred readily removable disks, blank on both sides but with contrasting colors on either side, said disks being designed to fill the frame and to conceal the respective numbers on the chart placed beneath them, and a right-angled shield for covering certain of the disks so that the total number of disks left exposed within the right-angle, to be determined by multiplying the number of disks on one side of the exposed rectangle by the number of disks in an adjacent side, can be found on the product chart beneath by lifting the disk within the apex of the right-angle.

FRANCIS A. WADE.
WILLIAM METZNER.

REFERENCES CITED

The following references are of record in the file of this patent:

UNITED STATES PATENTS

| Number | Name | Date |
|---|---|---|
| 356,167 | Shannon | Jan. 18, 1887 |
| 438,757 | Bliss | Oct. 21, 1890 |
| 637,964 | Johnsen | Nov. 28, 1899 |
| 898,587 | Matthias | Sept. 15, 1908 |
| 1,403,989 | Verneau | Jan. 17, 1922 |
| 1,668,328 | Martien | May 1, 1928 |
| 1,769,961 | Norrell | July 8, 1930 |
| 1,818,566 | McDade | Aug. 11, 1931 |

FOREIGN PATENTS

| Number | Country | Date |
|---|---|---|
| 59,455 | Austria | June 10, 1913 |
| 799,543 | France | Apr. 4, 1936 |